United States Patent
Dal Santo et al.

(10) Patent No.: US 10,739,159 B2
(45) Date of Patent: Aug. 11, 2020

(54) LABELING A SIGNIFICANT LOCATION BASED ON CONTEXTUAL DATA

(71) Applicant: Apple Inc., Cupertino, CA (US)

(72) Inventors: Michael P. Dal Santo, San Francisco, CA (US); Hyo Jeong Shin, Santa Clara, CA (US); Krishna M. Behara, Santa Clara, CA (US); Marcos R. Vescovi, Capitola, CA (US); Patrick Thomas Dillon, Mountain View, CA (US); Richard B. Warren, Redwood City, CA (US); Ronald K. Huang, San Jose, CA (US); Xufeng Han, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 558 days.

(21) Appl. No.: 15/272,282

(22) Filed: Sep. 21, 2016

(65) Prior Publication Data

US 2017/0357381 A1 Dec. 14, 2017

Related U.S. Application Data

(60) Provisional application No. 62/348,586, filed on Jun. 10, 2016.

(51) Int. Cl.
| | |
|---|---|
| G01C 21/36 | (2006.01) |
| H04L 29/08 | (2006.01) |
| H04W 4/14 | (2009.01) |
| H04W 4/021 | (2018.01) |
| G01C 21/00 | (2006.01) |

(52) U.S. Cl.
CPC ....... *G01C 21/3682* (2013.01); *G01C 21/005* (2013.01); *H04L 67/18* (2013.01); *H04W 4/021* (2013.01); *H04W 4/14* (2013.01)

(58) Field of Classification Search
CPC ............... H04W 4/021; G01C 21/3679; G01C 21/3682; G01C 21/3685; G06F 3/0481; G06F 3/04815; G06F 3/04817; G06F 3/0482; G06F 3/0484; G06F 3/04842; G06F 3/04845
See application file for complete search history.

(56) References Cited

U.S. PATENT DOCUMENTS

| | | | |
|---|---|---|---|
| 8,756,011 B2 | 6/2014 | Vengroff et al. | |
| 9,076,009 B2 | 7/2015 | Sathish et al. | |
| 9,113,293 B1* | 8/2015 | Rayburn | G01S 5/021 |
| 9,167,386 B2 | 10/2015 | Valaee et al. | |
| 10,070,261 B2 | 9/2018 | Dal Santo et al. | |

(Continued)

FOREIGN PATENT DOCUMENTS

WO WO 2016083937 6/2016

*Primary Examiner* — Amy Ng
*Assistant Examiner* — William Wong
(74) *Attorney, Agent, or Firm* — Jaffery Watson Mendonsa & Hamilton LLP

(57) ABSTRACT

Computer-implemented methods, computer-readable storage media storing instructions and computer systems for labeling significant locations based on contextual data can be implemented to perform operations that include determining a location of a computing device, and determining a label for the determined location based on contextual data associated with the significant location. The location can be a significant location that has meaning to a user of the device.

26 Claims, 6 Drawing Sheets

(56) References Cited

U.S. PATENT DOCUMENTS

| | | | |
|---|---|---|---|
| 2007/0130153 A1* | 6/2007 | Nachman | H04M 1/72544 |
| 2008/0147311 A1* | 6/2008 | Zoller | G01C 21/3682 |
| | | | 701/533 |
| 2008/0147461 A1 | 6/2008 | Lee et al. | |
| 2011/0039517 A1 | 2/2011 | Wigren et al. | |
| 2011/0046881 A1 | 2/2011 | Karaoguz | |
| 2012/0310736 A1* | 12/2012 | Vengroff | G06Q 30/02 |
| | | | 705/14.53 |
| 2013/0252638 A1* | 9/2013 | Yang | H04W 4/021 |
| | | | 455/456.3 |
| 2013/0262479 A1* | 10/2013 | Liang | G06F 16/24578 |
| | | | 707/748 |
| 2013/0321402 A1* | 12/2013 | Moore | G01C 21/3611 |
| | | | 345/419 |
| 2013/0339383 A1 | 12/2013 | Song et al. | |
| 2014/0213294 A1 | 7/2014 | Marti | |
| 2014/0329538 A1* | 11/2014 | Zhang | H04W 64/003 |
| | | | 455/456.1 |
| 2014/0365459 A1 | 12/2014 | Clark et al. | |
| 2014/0365913 A1* | 12/2014 | Santamaria | G06F 3/016 |
| | | | 715/748 |
| 2015/0350842 A1 | 12/2015 | Huang et al. | |
| 2017/0006430 A1* | 1/2017 | Chao | H04W 4/029 |
| 2018/0014161 A1 | 1/2018 | Warren et al. | |
| 2018/0376286 A1 | 12/2018 | Dal Santo et al. | |

\* cited by examiner

US 10,739,159 B2

LABELING A SIGNIFICANT LOCATION BASED ON CONTEXTUAL DATA

TECHNICAL FIELD

This disclosure relates generally to location-based services.

BACKGROUND

A map service can provide maps to one or more computing devices. The maps can include points of interest (POIs). A POI can be a place that is designated as useful or of interest to any user or all users. For example, a POI can be a shop, restaurant, or a hotel. Each POI may have an address (for example, a street address). To display a POI in a map, the map service can geocode the POI, including associating a location (for example, latitude and longitude coordinates) of the POI. The online map service can display a marker representing the POI on the map at the latitude and longitude coordinates. The inverse technique, reverse geocoding, attempts to determine a POI to which a given latitude and longitude refers.

SUMMARY

This disclosure describes technologies relating to labeling a significant location based on contextual data.

Certain aspects of the subject matter described in this disclosure can be implemented as a method. A computing device determines a location of the computing device. The computing device determines a label for the determined location based on contextual data associated with the location.

This, and other aspects, can include one or more of the following features. The location can be a significant location that represents an entity that is estimated to have meaning to a user of the computing device. To determine the significant location of the computing device, the computing device can obtain location information associated with the computing device. The computing device can receive multiple points of interest associated with the location information. Each point of interest represents an entity at a geographic location near a geographic location of the computing device. The geographic location includes the location information. To determine the label for the determined significant location based on contextual data associated with the significant location, the computing device can determine that one of the multiple points of interest is the determined significant location, and determine a label associated with the one of the multiple points of interest as the label for the determined significant location. The computing device can obtain the label associated with the determined significant location from an application executed by the computing device. The application can display the obtained label associated with the determined significant location at a user interface location on a user interface displayed by the computing device. The user interface location can correspond to a geographic location of the determined significant location. The location information can include a geographic area surrounding a geographic location of the computing device. The geographic area can represent an uncertainty associated with the geographic location of the computing device. At least some of the multiple points of interest can be located within the geographic area. The geographic area can be a first geographic area. All of the multiple points of interest can be located within a second geographic area that is larger than the first geographic area. The second geographic area can be twice as large as the first geographic area. To determine that one of the multiple points of interest is the significant location, the computing device can determine that a likelihood that the one of the multiple points of interest is the significant location is greater than a likelihood that any of the remaining points of interest is the significant location. Multiple map unique identifiers can be stored. Each map unique identifier can uniquely identify a significant location of multiple significant locations and include a respective label unique to each significant location of the multiple significant locations. To determine the label for the determined significant location based on contextual data associated with the significant location, the computing device can identify a map unique identifier associated with the determined significant location. The contextual data can include a payment transaction using a payment application implemented by the computing device between the user and the determined significant location. The payment transaction can provide a time of the payment transaction and a significant location at which the payment transaction occurred. To determine the label for the determined significant location based on contextual data associated with the significant location, the computing device can determine that the computing device was at the significant location at the time of the payment transaction. The contextual data can include a calendar event stored in a calendar application implemented by the computing device. The calendar event can mention the label of the significant location. To determine the label for the determined significant location based on contextual data associated with the significant location, the computing device can identify the label of the significant location mentioned in the calendar event. To identify the label of the significant location mentioned in the calendar event, the computing device can determine that the calendar event mentions a location, and determine that the calendar event mentions a location. To identify the label of the significant location included in the calendar event, the computing device can determine that the computing device is located at the significant location between time boundaries specified in the calendar event. The contextual data can include a reminder stored in a calendar application implemented by the computing device. The reminder can mention the label of the significant location. To determine the label for the determined significant location based on contextual data associated with the significant location, the computing device can identify the label of the significant location mentioned in the reminder. To identify the label of the significant location mentioned in the reminder, the computing device can determine that the reminder mentions a location, and determine that the mentioned location is a significant location. The contextual data can include information received from a map application implemented by the computing device. The information can include route information including a destination location. To determine the label for the determined significant location based on contextual data associated with the significant location, the computing device can determine that the destination location is the determined significant location. To determine that the destination location is the determined significant location, the computing device can determine a first time at which the destination location was reached, a second time at which the computing device was located at or near the significant location, and that the destination location is the determined significant location based on determining that the first time substantially matches the second time. The information can include destination locations identified as favorite locations by the user of the computing device. To determine the label for the determined significant location based on contextual data associated with the significant location, the computing device can determine that one of the locations identified as a favorite location by the user is the determined significant location. The information can include destination locations previously viewed using the map application by the user of the computing device. To determine the label for the determined significant location based on contextual data associated with the significant location, the computing device can determine that one of the locations previously viewed using the map application by the user is the determined significant location. The information can include destination locations viewed using a third party application implemented by the computing device. The map location can receive a destination location viewed using the third party application. To determine the label for the determined significant location based on contextual data associated with the significant location, the computing device can determine that the destination location viewed using the third party application is the determined significant location. The contextual data can include communications between the computing device and at least one other computing device. The communications can include text messages exchanged between the computing device and the at least one other computing device. At least one of the text messages can mention the significant location. To determine the label for the determined significant location based on contextual data associated with the significant location, the computing device can identify the significant location mentioned in the at least one of the text messages. The communications can include audio messages exchanged between the computing device and the at least one other computing device. At least one of the audio messages can mention the significant location. To determine the label for the determined significant location based on contextual data associated with the significant location, the computing device can identify the significant location mentioned in the at least one of the audio messages. The audio messages can include voicemail. At least one of the audio messages can be included in an audio conversation between the computing device and the at least one other computing device. At least one of the audio messages can be included in a video conversation between the computing device and the at least one other computing device. The communications can include at least one of a time at which the computing device will be located at the significant location or a context, based on which the significant location is identifiable. The contextual data can include a movement pattern of the computing device between the multiple significant locations. To determine the label for the determined significant location based on contextual data associated with the significant location, the computing device can determine that the computing device has a dwell time at the determined significant location that is greater than a threshold dwell time. Based on the movement pattern, the computing device can determine a physical activity performed by the user of the computing device at the significant location. To determine the label for the determined significant location based on contextual data associated with the significant location, the computing device can determine the label based on the physical activity. The contextual data can include multiple contextual data points. To determine the label for the determined significant location based on contextual data associated with the significant location, the computing device can determine a potential significant location based on each of the multiple contextual data points resulting in multiple potential significant locations, and determine one of the multiple potential significant locations to be the determined significant location. To determine one of the multiple potential significant locations to be the determined significant location, the computing device can determine that more than half of the multiple potential significant locations are the same potential significant locations. To determine one of the multiple potential significant locations to be the determined significant location, the computing device can associate a respective weight to each potential significant location, the respective weight based on the contextual data point on which each potential significant location was determined.

Certain aspects of the subject matter described here can be implemented as a computer-readable medium storing instructions executable by one or more processors to perform operations described here. Certain aspects of the subject matter described here can be implemented as a system including one or more processors and a computer-readable medium storing instructions executable by the one or more processors to perform operations described here The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Exemplary Use Cases

Figure 1:
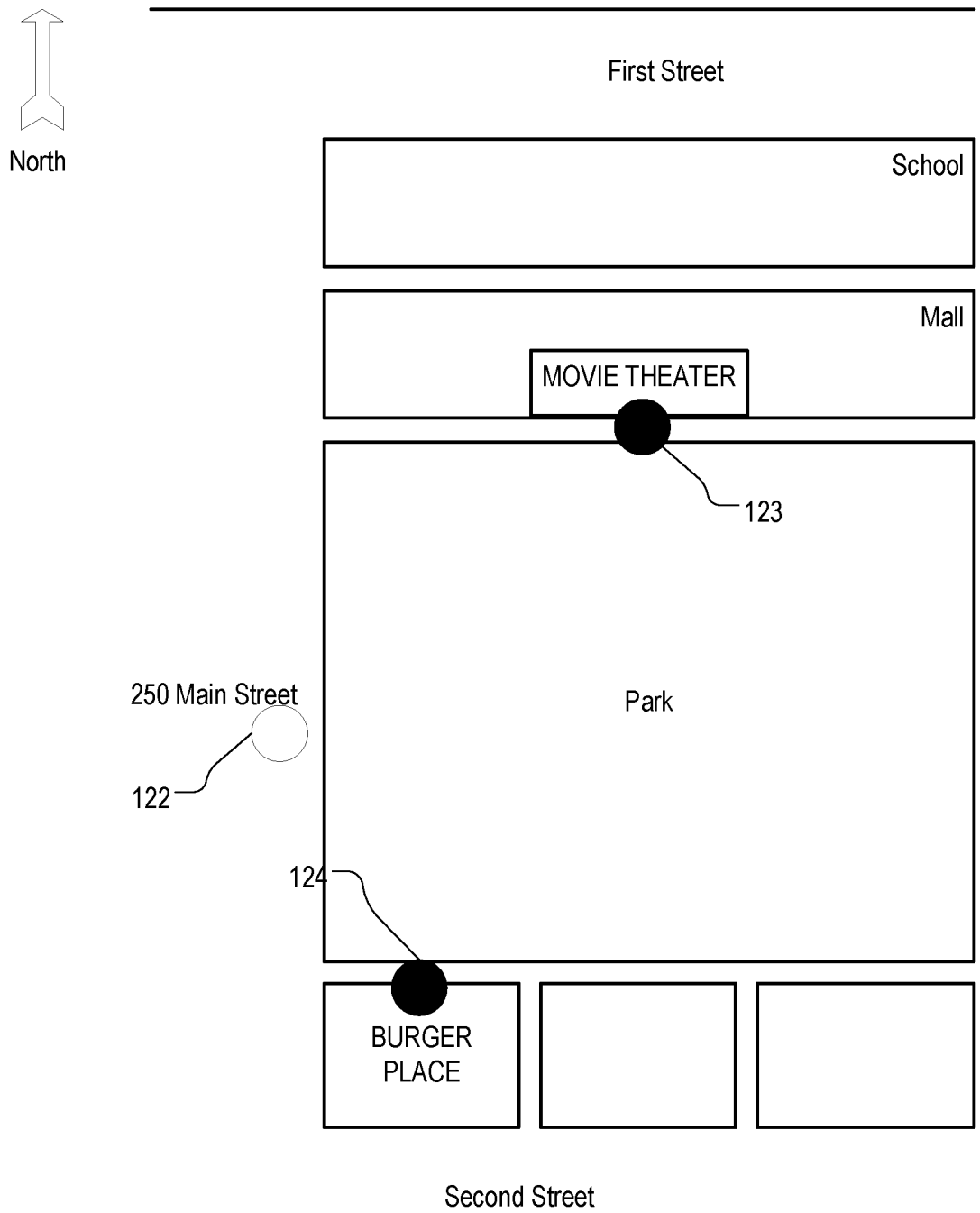
FIG. 1 is a schematic diagram of an example virtual map presented by a computing device showing POIs and a significant location.

FIG. 1 is a schematic diagram of an example map presented on a display of a computing device. In the example shown, the computing device (e.g., a smartphone, tablet computer, wearable device, desktop computer or other computing device) executes a map application that displays a map of a geographic area including three streets: Main Street (going north-south), and cross streets First Street and Second Street, each going east-west. The map application overlays on the map POI markers 123, 124 representing a "MOVIE THEATER" and a "BURGER PLACE," respectively. In general, a POI can be a business, landmark, public park, school or any other entity that is of interest to or is meaningful to any user or all users.

In addition to POI markers 123, 124, the map application also displays a marker 122 representing a location of the computing device. In some instances, the location of the computing device can be any geographic location at which the computing device is physically located. In an example in which the computing device is a smartphone or a wearable device (for example, a smartwatch) or an automobile information and entertainment center, the marker 122 can be displayed at a location of a user possessing the smartphone. In some instances, the location of the computing device can be a location that is significant to the user of the computing device. For example, a significant location can be the user's home or work address or a location that the user has visited several times in the past (e.g., a frequently visited business).

Determining that a location is a significant location can include determining that the computing device dwells at the significant location for at least a threshold amount of time. As described below, the significant location can be inferred from clusters of latitude and longitude readings from location sensors, e.g. GPS, which were gathered previously. As such, the significant location may have associated geographic uncertainty—that is, its boundaries may not be precisely known. The associations between its cluster of latitude and longitude readings and one or more POIs may also not be known. Determining that a location is a significant location can include determining that the computing device dwells at the significant location for at least a threshold amount of time.

Therefore, a significant location may be represented by a marker on the map with a label that is not meaningful to the user. For example, a significant location for the user may be a frequently visited restaurant, such as BURGER PLACE 124. The user would expect to see the significant location marker 122 located at, for example, the entrance to BURGER PLACE 124 with an appropriate label describing the restaurant. However, since significant locations are estimated (e.g., using a classifier or machine learning), the location marker 122 is in the middle of Main Street with a generic label (e.g., only a street address) that has no meaning to the user. This results in a poor user experience with the map application. By labeling the geographic location 122 with a label that is meaningful to the user (e.g., "BURGER PLACE"), the map application personalizes the significant location to the user, thereby enhancing the user's experience with the map application.

Implementations of the subject matter described in this disclosure can enhance operation of a computing device by using contextual data stored on or accessible by the computing device to improve the usefulness of significant locations to a user. Contextual data can include data unique to the computing device or personalized for a user of the computing device (or both). The contextual data can include data collected based on the user's usage of the computing device, for example, based on executing, using the computing device, one or more applications that the computing device is configured to execute. In some implementations, the contextual data collected based on usage of the computing device can include any input provided to the computing device to execute any application. The input can be expressly provided by the user or can be inherently obtained in response to the user performing an action. The contextual data can include any output provided by the computing device either in response to any input or in response to executing any application. The contextual data can include any information derived or inferred by the computing device based on usage (present or past usage or both) of the computing device, on an environment in which the computing device is or was present, based on information received from the computing device from a source other than the user (for example, a central server, a Wi-Fi™ service provider, a telephony service provider or other source) or any combination of them. For example, by leveraging contextual data that is already being collected for other applications running on the computing device to label significant locations, the utility of significant locations to the user is improved without expending additional resources to collect or derive additional data. This results in an improvement to the computing device by preserving memory and storage and reducing power consumption by the computing device by not performing additional data collection and processing.

Exemplary Labeling of Significant Locations Based on Contextual Data

Figure 2A:
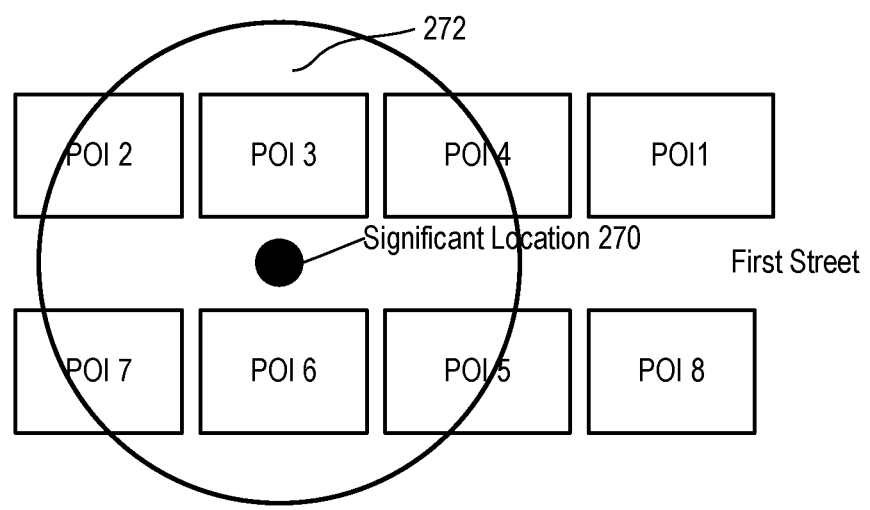
FIG. 2A is a schematic diagram illustrating multiple points of interest near a significant location.

FIG. 2A is a schematic diagram illustrating POIs near a significant location 270. The schematic diagram illustrates that multiple POIs can fall within an uncertainty associated with a significant location. In the example shown, the significant location 270 is located among 8 POIs (POI 1-POI 8). The uncertainty associated with the significant location 270 defines a geographic area of uncertainty 272 that encompasses a subset of the POIs (for example, POIs 2, 3, 4, 5, 6 and 7). In some implementations, the computing device 200 can store or derive contextual data associated with at least one of the subset of the POIs encompassed by the geographic area of uncertainty 272. For example, the user of the computing device 200 may have executed a payment transaction using the computing device 200 at POI 3. Contextual details associated with the payment transaction (e.g., timestamp, merchant name and address or other business identifier) can be stored on the computing device 200 during the transaction. The contextual details associated with payment transactions can further show that the user has not executed a payment transaction at any of the other POIs in the subset of POIs over a specified time period.

In another example, a disambiguation based on crowd-sourced payment history can be used to identify POI 3. For example, several users of respective computing devices may have executed respective payment transactions using their respective computing devices at POI 3. Contextual details associated with each payment transaction (e.g., timestamp, merchant name and address or other business identifier) can be stored on respective computing devices during respective transactions. The contextual details associated with payment transactions can further show that some or all the users have not executed payment transactions at any of the other POIs in the subset of POIs over a specified time period.

In a further example, the user of the computing device 200 may have frequented POI 3 multiple times over a duration (for example, a week, a month). The computing device 200 can store a dwell time of the computing device 200 at POI 3 or a map route to the POI 3. The number of visits can be tracked with a software counter. The dwell time can be determined from a motion sensor (e.g., accelerometer) or GNSS receiver on the computing device 200 and a timer. Based on such contextual details (or other contextual details such as those described below), the computing device 200 can determine that, out of all the POIs in the subset, POI 3 is most likely to be the significant location. For example, based on multiple visits to the same geographic location and multiple payment transactions at POI 3 during each of those visits, the computing device 200 can determine that POI 3 is most likely to be the significant location. The maps engine 206 can identify a label (e.g., a merchant name) associated with POI 3. For example, the label can be stored in the POI database 210. The identified label is meaningful to the user of the computing device 200 because the user has visited POI 3 one or more times in the past.

Figure 2B:
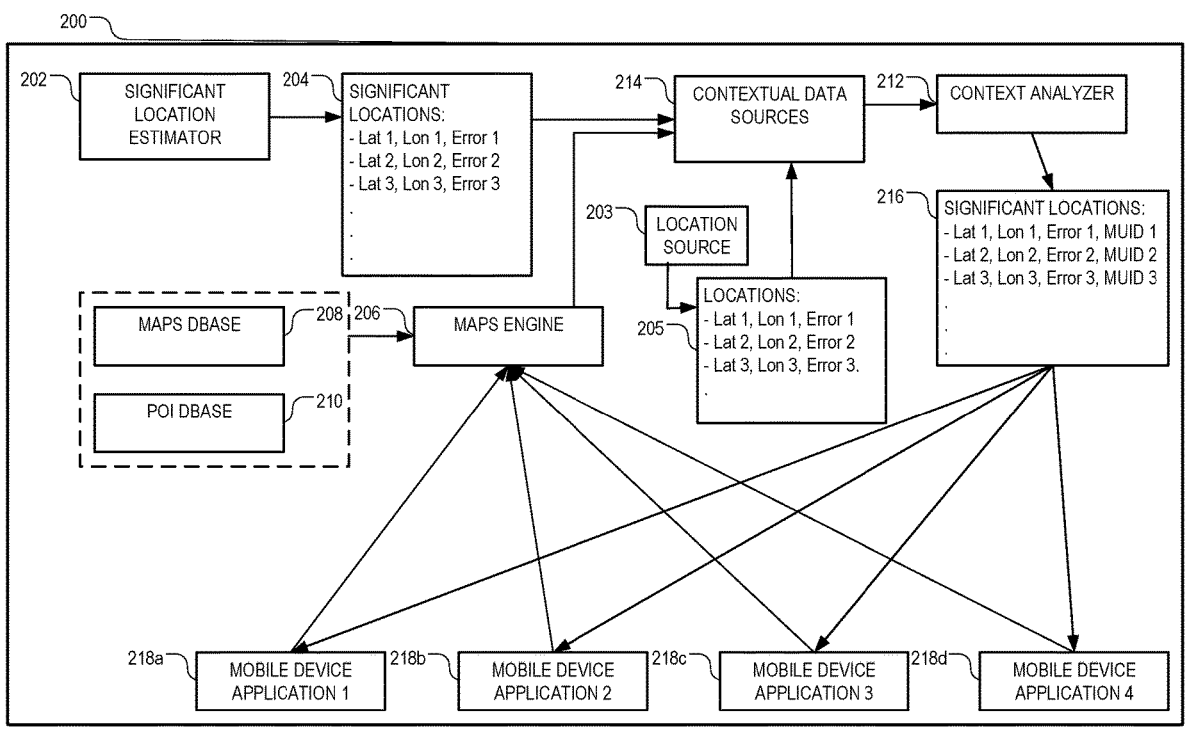
FIG. 2B is a block diagram illustrating components of an example system for implementing labeling of significant locations based on contextual data.

FIG. 2B is a block diagram illustrating components of an exemplary computing device 200 implementing labeling of locations, for example, significant locations or any location, based on contextual data associated with or stored on (or both) the computing device. Returning to the example described above with reference to FIG. 2A, by implementing the techniques described below with reference to FIG. 2B, the location of the computing device 200 can be resolved to POI 3 from among the subset of POIs, namely, POIs 2, 3, 4, 5, 6 and 7. The computing device 200 can include one or more processors and a computer-readable storage medium storing instructions executable by the one or more processors to perform operations described herein. Additional details about the computing device 200 architecture are described below with reference to FIG. 5. The computing device 200 includes multiple components (for example, multiple modules), each of which can be implemented as computer instructions executable by the one or more processors, as described in reference to FIG. 5.

In some implementations, the computing device 200 includes a significant location estimator 202. The significant location estimator 202 can output significant locations 204. Each significant location can be associated with an entity POI that is located at a geographic location. Each POI is estimated to have meaning to any user of any computing device or all users of respective computing devices. For example, a significant location can include the user's home or work place or other location that the user of the computing device frequently visits. For example, a significant location can include a business such as the user's favorite restaurants, movie theaters, or other shops.

In some implementations, the computing device 200 includes a location source 203 that can output locations 205. Each location output by the location source 203 can be associated with a POI that is located at a geographic location. A location output by the location source 203 may or may not have significance to the user of the computing device. Therefore, a location output by the location source 203 may overlap with a location output by the significant location estimator 202.

In some implementations, each location (e.g., location output by the significant location estimator 202 or the location source 203) can be represented by an estimated geographic location and data representing a measure of uncertainty or error in the estimated location. The geographic location can be identified by position coordinates in any reference coordinate frame such as a geodetic or East North Up (ENU) reference coordinate frame. In an implementation, the geographic location is represented by latitude, longitude and altitude. The uncertainty or error can be a statistical variance associated with the estimated significant location. In an implementation, the error can be represented on a map as a geographic area (e.g., a circle or other polygon) surrounding the estimated significant location. The exact location of the significant location can be anywhere within the geographic area. In some implementations, the significant location estimator 202 and the location source 203 can generate, output and store a list of significant locations 204 and a list of locations 205, respectively. Over time, the significant location estimator 202 can update the list, for example, by adding more significant locations or removing locations that are no longer significant (e.g., locations that have not been visited for a long period of time). In an implementation, the list is an ordered list with the significant location at the top of the list having the lowest uncertainty or error. Similarly, over time, the locations in the location source 203 can also be updated.

The computing device 200 can include a maps engine 206 connected to a maps database 208 and a POI database 210. The maps engine 206 is also accessible by computing device applications 218a-218d through, for example an application programming interface (API). The computing device applications 218a-218d can request map data from maps engine 206 that can be rendered into a map. In an implementation, the maps database 208 and POI database 210 can be a single database. The maps database 208 maintains map data for generating a map including data for rendering streets, highways, freeways and the like on the map. The POI database 210 maintains a list of entities (e.g., businesses, public landmarks, parks, schools, hospitals) that can be represented by markers (e.g., virtual pushpins) overlaid on the map. For example, the maps database 208 can store a street address of an entity and the POI database 210 can store information identifying the entity as a particular restaurant, which can serve as the label for the entity. In particular, POI database 210 can store one or more labels for each of the entities. The one or more labels can include, for example, a business name of an entity provided by a POI service, a tag entered by a user for the entity, or a contact name associated with the entity in a contact list (e.g., a home or work address). The maps database 208 and the POI database 210 can provide the list of entities and their identities to the maps engine 206. The maps engine 206 can display markers representing the significant locations in the map together with the markers for the POIs.

The computing device 200 includes a context analyzer 212 configured to collect and analyze contextual data to identify and provide a label to a location (e.g., a location output by the significant location estimator 202 or a location output by the location source 203) at or near which the computing device is located. In some implementations, a location processor in the computing device 200 can obtain (e.g., receive or estimate) a geographic location of the computing device 200. For example, the location processor can receive or derive the geographic location of the computing device from signals transmitted by a terrestrial-based or satellite-based location estimation system, such as, for example, a Wi-Fi™ station, cell tower or Global Navigation Satellite System (GNSS). An example GNSS system is the Global Positioning System (GPS). The geographic location of the computing device can be represented by a latitude, longitude and altitude. The estimated geographic location of the computing device can also include an uncertainty, which can be represented by a geographic area (e.g., circular region or other polygon) surrounding the estimated geographic location of the computing device. In some implementations, the context analyzer 212 can generate and output a list of significant locations 216 that includes, for each significant location, location information (for example, latitude or longitude or altitude or any combination of them, and an uncertainty) and a maps unique identifier (MUID) (described below).

The maps engine 206 can obtain POIs associated with, for example, near, a significant location. As described earlier, each POI represents an entity within or near a geographic area of uncertainty surrounding the estimated significant location. For example, the maps engine 206 can provide the POIs, which are stored in the POI database 210 or retrieved from a network-based POI service if available. The geographic locations of the POIs can reside inside or outside the geographic area of uncertainty associated with the estimated significant location. The maps engine 206 can determine that at least one of the POIs is a significant location by comparing the geographic locations of the POIs with the geographic locations of the significant locations in the list of significant locations 204 provided by the significant location estimator 202. If a significant location is the same as a POI location, then the significant location can be replaced by the POI or can assume the label of the matching POI. If, however, there is no match, the context analyzer 212 can determine that one of the POIs is a significant location based on contextual data associated with the POIs, as described with reference to FIG. 2B.

Figure 3A:
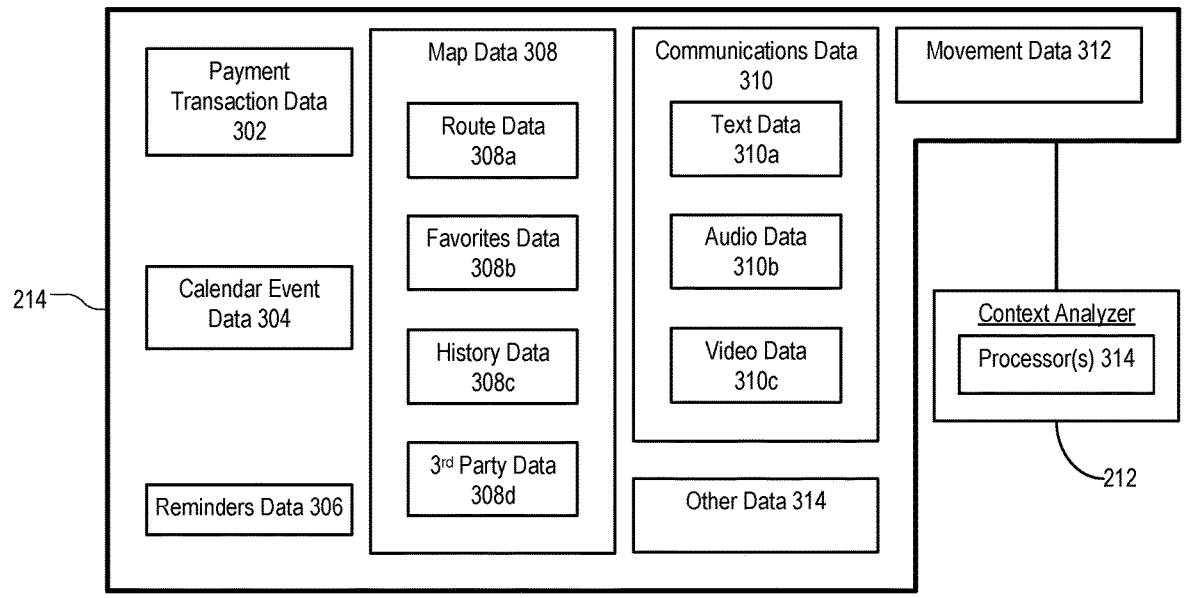
FIG. 3A is a block diagram illustrating contextual data sources used to identify labels for significant locations.

FIG. 3A is a block diagram illustrating contextual data sources 214 used to identify labels for significant locations. The contextual data sources 214 can include multiple components, each storing contextual data using which the context analyzer 212 can identify a label associated with a significant location. Several examples of contextual data for identifying labels associated with significant locations are described below. If the label is associated with a POI in the POI database 210, the POI can be associated with a POI identifier or a map unique identifier (MUID). When a computing device application 218a-218d running on the computing device 200 requests a significant location that can be mapped to a nearby POI, the MUID for the POI can be provided to the requesting application. The requesting application can then send the MUID to the maps engine 206 (e.g., through an API), which can be used by the maps to retrieve the label from the POI database 210.

In the examples for identifying a label described below, an identified label is described as being displayed in a user interface. In some implementations, a confidence level for the identified label can be determined and displayed in the user interface together with the label. The confidence level can represent a likelihood that the identified label matches the accurate label of the significant location. For example, the confidence level can be indicated by a marker (for example, by presenting a question mark next to the label or by presenting the label in a particular color or other marker). The marker is editable allowing a user to either confirm that the identified label is accurate or to correct the label. A correction to a label can include re-labeling the displayed label to be the accurate label. Alternatively or in addition, the correction can include labeling a different, more accurate significant location with the identified label. In response to the user editing the label, the edit is reflected on other appearances of the same significant location and when the computing device is located at the significant location at a future instance.

Identifying a Label Based on Payment Transaction

In some implementations, computing device 200 can determine a label for a significant location based on payment transaction data 302 or a history of payment transactions stored by a payment application implemented by the computing device 200. The payment transactions can include a time of the payment transaction, the location of the transaction (e.g., point of sale) and an identity (e.g., merchant name or business identifier) of the significant location at which the payment transaction occurred. In some cases, the significant location can be a POI in the POI database 210. For example, if the user is at a restaurant (labeled "Burger Place") and executes the payment application on the computing device 200 to complete a transaction with the restaurant, then the payment application can store a time of the transaction, the location of the transaction and the merchant name "Burger Place" as payment transaction data 302. When the significant location estimator 202 provides a significant location, the significant location can be associated with the MUID for "Burger Place" based on the transaction data. A marker for the significant location is displayed on the map with the label "Burger Place." The label "Burger Place" has meaning to the user because the user purchased food at the Burger Place one or more times in the past.

Identifying a Label Based on Calendar Events

In some implementations, computing device 200 can determine a label for a significant location based on calendar event data 304. The contextual data sources 214 can include calendar event data 304 received from a calendar application implemented by the computing device 200. The calendar event data 304 can include a location field with an address or a text string that includes a "hint" of a location. For example, the text string could recite "Dinner at Bob's Summer home in the Hamptons." That text can be used to search a contact or address book for Bob's Summer home address. A label of a significant location that is near Bob's Summer home can be updated with the exact address found in the contact or address book. If there is a populated location field, the address can be taken from the calendar event data 304.

Identifying a Label Based on Reminders

In some implementations, computing device 200 can determine a label for a significant location based on reminders data 306. The contextual data sources 214 can include reminders data 306 received from one or more applications implemented by the computing device 200. For example, the reminders data 306 can be received from the calendar application. Alternatively, the reminders data 306 can be received from a notes application executed by the computing device 200 to create and store a note in reply to instructions from the user. For example, in response to the user speaking a voice command, "Remind me to get milk at the grocery store," the computing device 200 can create a reminder with the text spoken by the user. In this example, the reminder mentions the significant location, namely, "the grocery store". The context analyzer 212 can determine that "grocery store" represents a significant location. For example, the context analyzer 212 can determine if any POIs near the significant location is a grocery store and use the POI label for the grocery store to label the significant location with a meaningful label. In some cases, there may be multiple grocery store POIs near the significant location. In these cases, additional contextual data sources 214 can be used to narrow the multiple POIs to a single POI. For example, if the user has visited a particular POI more than others in the past, that contextual data can be used to filter the POIs to a single POI. In another example, transaction data can be used to filter the POIs as described above.

Identifying a Label Based on Map Data

In some implementations, computing device 200 can determine a label for a significant location based on map data. The contextual data sources 214 can include map data 308 received from a map application implemented by the computing device 200, for example, the maps engine 206.

For example, the map data 308 can include route data 308a that stores routes traveled by the computing device 200. The route data 308a can include route information including a destination location. The destination location can be a location that the significant location estimator 202 has previously determined to be a significant location. The context analyzer 212 can determine that the destination location is at or near a POI with an assigned label. Based on this determination, the context analyzer 212 can assign the label of the POI to the significant location and store the label in the route data 308a. In this manner, the context analyzer 212 can use the route data 308a to label the significant location.

In another example, the map data 308 can include favorites data 308b that stores locations identified as "Favorites" by the user of the computing device 200. The locations identified as favorites can be significant locations. One or more of the significant locations, e.g., locations identified as favorites, can also be POIs with respective assigned labels. The context analyzer 212 can determine that a significant location identified as a favorite is also a POI. Based on this determination, the context analyzer 212 can assign the label of the POI to the significant location and store the label in the favorites data 308b.

In a further example, the map data 308 can include history data 308c that stores locations that the user of the computing device 200 viewed using the maps application or that the user viewed and visited. For example, the user can view a significant location in the maps application by selecting a marker on a map representing the significant location to view details and perhaps photos of the significant location. A location that the user viewed and visited has a higher likelihood of being a significant location than a location that a user only viewed, especially when the user visited the location multiple times. One or more of the significant locations, i.e., locations that the user viewed (or viewed and visited), can also be POIs with respective assigned labels. The context analyzer 212 can determine that a significant location that the user viewed (or viewed and visited) is also a POI. Based on this determination, the context analyzer 212 can assign the label of the POI to the significant location and store the label in the history data 308c.

In another example, the map data 308 can include third party data 308d. The computing device 200 can be configured to implement third party applications, i.e., applications created by parties other than those that developed the computing device 200. Certain third party applications can provide locations to the user of the computing device 200, for example, in response to a search request. An exemplary third party application is one that provides suggestions for restaurants in response to a user searching for restaurants within a geographic area. The maps application can display the geographic location of a restaurant provided by such a third party application. In addition, the maps application can store location information associated with the restaurant including, for example, the geographic location, the restaurant's name or other location information. The computing device 200 can determine that the restaurant provided by the third party application is a significant location, for example, if the user visits the restaurant (one or more times) or if the user frequently views the restaurant using the third party application (or both). In this manner, the computing device 200 can identify multiple significant locations based on usage of the third party application. One or more of the significant locations, i.e., locations that the user viewed (or viewed and visited) using the third party application, can also be POIs with respective assigned labels. The context analyzer 212 can determine that a significant location that the user viewed (or viewed and visited) using the third party application is also a POI. Based on this determination, the context analyzer 212 can assign the label of the POI to the significant location and store the label in the third party data 308d.

In a further example, accessing a POI on a third party application (for example, viewing, browsing or selecting the POI) is, by itself, an indication that the POI is relevant. That is, the POI is relevant even if the map data 308 does not receive the POI from the third party application. In such instances, the POI selected using the third party application can be stored (for example, as "favorite" or "relevant" locations) and be matched against potential POIs at which the computing device 200 can be located.

Identifying a Label Based on Communications Data

In some implementations, computing device 200 can determine a label for a significant location based on communications data. The contextual data sources 214 can include communications data 310 received from a communication application implemented by the computing device 200. For example, the communications data can include communications between the computing device 200 and at least one other computing device. The communication application can be a telephone application, a text message application, an audio communication application, an email application, a digital assistant application, a video communication application or any other application in which communications are sent from or received by the computing device 200.

For example, the communications data 310 can include text data 310a that stores text messages exchanged between the computing device 200 and at least one other computing device. The text messages can include text that mentions a significant location. The location mentioned in the text message can also be a POI with an assigned label. The context analyzer 212 can extract text from the text message and identify a POI (for example, a business) whose name is the same as or substantially similar to the extracted text. Upon finding a match, i.e., upon determining that a threshold likelihood that the extracted text matches the business name is satisfied, the context analyzer 212 can assign the label of the POI to the significant location and store the label in the text data 310a.

In another example, the communications data 310 can include audio data 310b that stores audio messages exchanged between the computing device 200 and at least one other computing device. The audio messages can include audio exchanged during voice calls, audio included in voicemail messages (either incoming voicemail message or voicemail messages left on other devices using the computing device 200), audio included in other communication applications or combinations of them. The audio messages can include audio that mentions a significant location. The location mentioned in the audio message can also be a POI with an assigned label. The context analyzer 212 can identify a POI (for example, a business) whose name is the same as or substantially similar to that of a significant location mentioned in the audio message. Upon finding a match, i.e., upon determining that a threshold likelihood that the name in the audio message matches the business name is satisfied, the context analyzer 212 can assign the label of the POI to the significant location and store the label in the audio data 310b.

In a further example, the communications data 310 can include video data 310c that stores video messages (including images, such as video, and audio) exchanged between the computing device 200 and at least one other computing device. The video messages can include images or audio (or both) that mentions a significant location. The location mentioned in the video message can also be a POI with an assigned label. The context analyzer 212 can identify a POI (for example, a business) whose name is the same as or substantially similar to that of a significant location mentioned in the video message. Upon finding a match, i.e., upon determining that a threshold likelihood that the name in the video message matches the business name is satisfied, the context analyzer 212 can assign the label of the POI to the significant location and store the label in the audio data 310b.

In some implementations, the communication data can include a mention of a time or a context based, either or both of which can be used to resolve multiple POIs to a single significant location. For example, the communication data can include the statement "See you at the Burger King around 8 pm" in any format (i.e., audio, video, text or combinations of them). The mention of time—"8 pm"—in the communication can be used to further resolve the significant location at which the computing device is present. In another example, the communication data can include the statement "I will eat sushi tonight at 8 pm." The mention of "sushi" can provide a context indicating that the computing device will be located at a Japanese restaurant at 8 pm. The context, taken alone or in combination with the time, can be used to resolve the significant location at which the computing device is present.

Identifying a Label Based on Movement Data

In some implementations, computing device 200 can determine a label for a significant location based on movement data. The contextual data sources 214 can include movement data 312 received from an inertial sensor, GNSS receiver or digital pedometer application or other movement data source available to the computing device 200. For example, the computing device 200 can determine based on GNSS data that the computing device 200 is at a location in which POIs are aggregated (such as a mall with multiple shops, restaurants and a movie theater). The movement of the computing device 200 can be tracked between the multiple POIs. The context analyzer 212 can identify a label to be assigned to a significant location based on the movement (or lack of movement) of the computing device 200 between the multiple POIs. For example, a dwell time of the computing device 200 when the computing device 200 is at the movie theater is likely to be significantly higher than a dwell time of the computing device 200 when the computing device 200 is elsewhere (such as at a store or a restaurant). Based on the increased dwell time, the context analyzer 212 can determine that the computing device 200 is at the movie theater. The context analyzer 212 can identify a label for the movie theater based on the movie theater having also been designated as a POI, and store the label in movement data 312.

In some implementations, the computing device 200 can include one or more motion sensors (e.g., accelerometer, gyroscope, magnetometer or other motion sensors). Using the motion sensors or other sensors (or both), the context analyzer 212 can determine a type of physical activity being performed by the user of the computing device 200. For example, if the motion sensor indicates oscillation, the speed indicates running and the location of the computing device 200 remains unchanged, then the context analyzer 212 can determine that the user is running on a treadmill. If the context analyzer 212 determines that the potential significant locations at which the computing device 200 can be present can include a gym or a travel agency, the context analyzer 212 can increase a likelihood that the computing device 200 is at the gym, not the travel agency, based on motion information sensed by the motion sensors or other sensors.

Other Examples

In some implementations, computing device 200 can determine a label for a significant location based on other data 314. The contextual data sources 214 can include other data 312 storing labels assigned to significant locations using techniques other than those described here. For example, the computing device 200 can determine that a wireless network signature received by the computing device 200 is identical to a wireless network signature of another computing device 200 indicating a strong likelihood that both computing devices are at the same geographic location. Also, both computing devices can be connected to the same central server that has determined (or received information specifying) a label for the geographic location in which the other computing device is located. Because both computing devices are located at the same geographic location, the computing device 200 can receive the label from the central server and assign the label to the geographic location at which the computing device 200 is located. As an alternative or in addition to receiving the label from the same central server, the computing device 200 can receive the label from the other computing device.

In another example, the computing device 200 can be located next to two POIs, each having an equal or nearly equal likelihood of being a significant location. The context analyzer 212 can determine that one of the two POIs is closed at a time at which the computing device 200 is located next to the two POIs. Based on this determination, the context analyzer 212 can determine that the POI that is open is the significant location and assign the label of the open POI to the significant location.

In a further example, each context data source can assign a label to a significant location after multiple visits by the user to the same significant location.

Each of the context data sources described above can provide contextual data points for identifying a label to be associated with a significant location. The context analyzer 212 can identify multiple potential significant locations based on the contextual data points. The context analyzer 212 can disambiguate and resolve the multiple contextual data points to identify one of the multiple potential significant locations as having the highest likelihood of being the significant location at which the computing device 200 is located. For example, the context analyzer 212 can resolve the multiple potential significant locations to one significant location if more than half of the contextual data points identify the same POI as being that significant location. In another example, the context analyzer 212 can assign a respective weight to each potential significant location. The weights can be the same or different. For example, a contextual data point received from a maps application can be given more weight than a contextual data point received from a text messaging application. To resolve the multiple potential significant locations to one significant location, the context analyzer 212 can execute a weighted algorithm that considers the respective weight given to each contextual data point.

In some implementations, a search engine history, favorites list, reading list or bookmarks may contain contextual data that can be used to label a significant location. If multiple POIs are near a significant location, then the user's search history, favorites list, reading list or bookmarks can be used to filter the POIs. For example, referring again to the example of FIG. 1, a significant location may be near MOVIE THEATER and BURGER PLACE. Each of these POIs could be the actual significant location. However, the user bookmarked BURGER PLACE and/or has a search history that includes multiple searches on BURGER PLACE. In this case, BURGER PLACE could be selected over MOVIE THEATER as being the significant location.

In an embodiment, voice commands can be parsed to extract words or phrases that could provide "hints" about which of multiple POIs near a significant location is the significant location. For example an intelligent personal assistant or knowledge navigator could receive a voice command "navigate to Burger Place" or a voice command "call Burger Place". These voice commands can be contextual data that can be used to filter POIs.

Figure 3B:
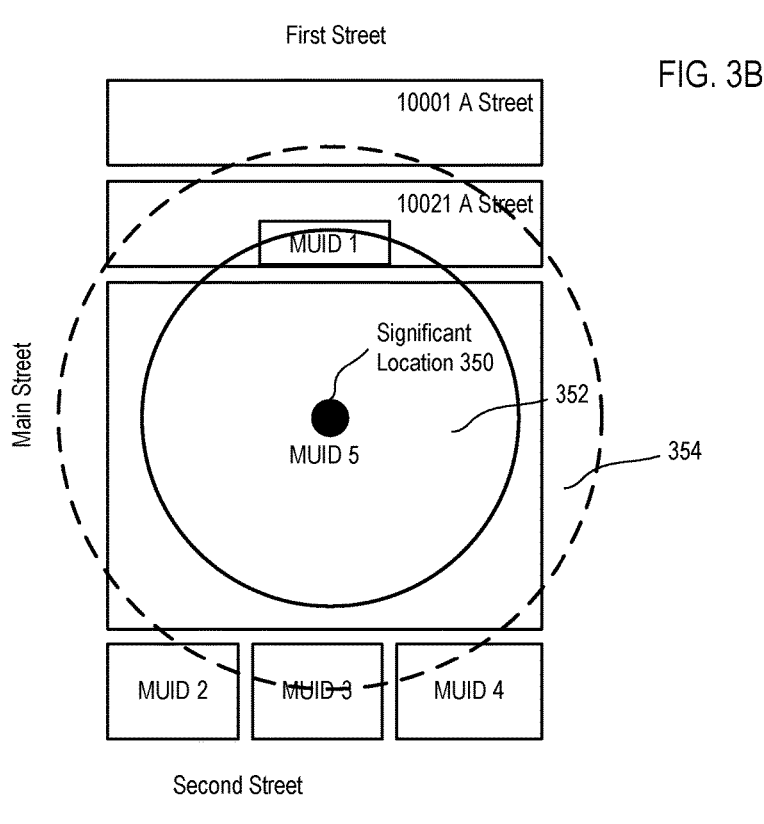
FIG. 3B is a schematic diagram illustrating two geographic areas associated with a significant location encompassing POIs.

FIG. 3B is a schematic diagram illustrating an extension of a geographic area of uncertainty encompassing a significant location. In the examples described above, data stored in each context data source was described as identifying a label for one significant location. In the example shown, an estimated significant location 350 is surrounded by a geographic area of uncertainty 352. The geographic area of uncertainty 352 represents an uncertainty associated with the estimated significant location 350. That is, the actual significant location of the computing device 200 can be located anywhere within the geographic area of uncertainty 352. To label the significant location, the computing device 200 can consider all the POIs that reside (either completely or partially) within the geographic area of uncertainty 352. In some implementations, to label the significant location, the computing device 200 can consider all the POIs that reside (either completely or partially) within a second geographic area of uncertainty 354 that is larger than (for example, by a factor greater than one such as two) the geographic area of uncertainty 352.

Figure 4:
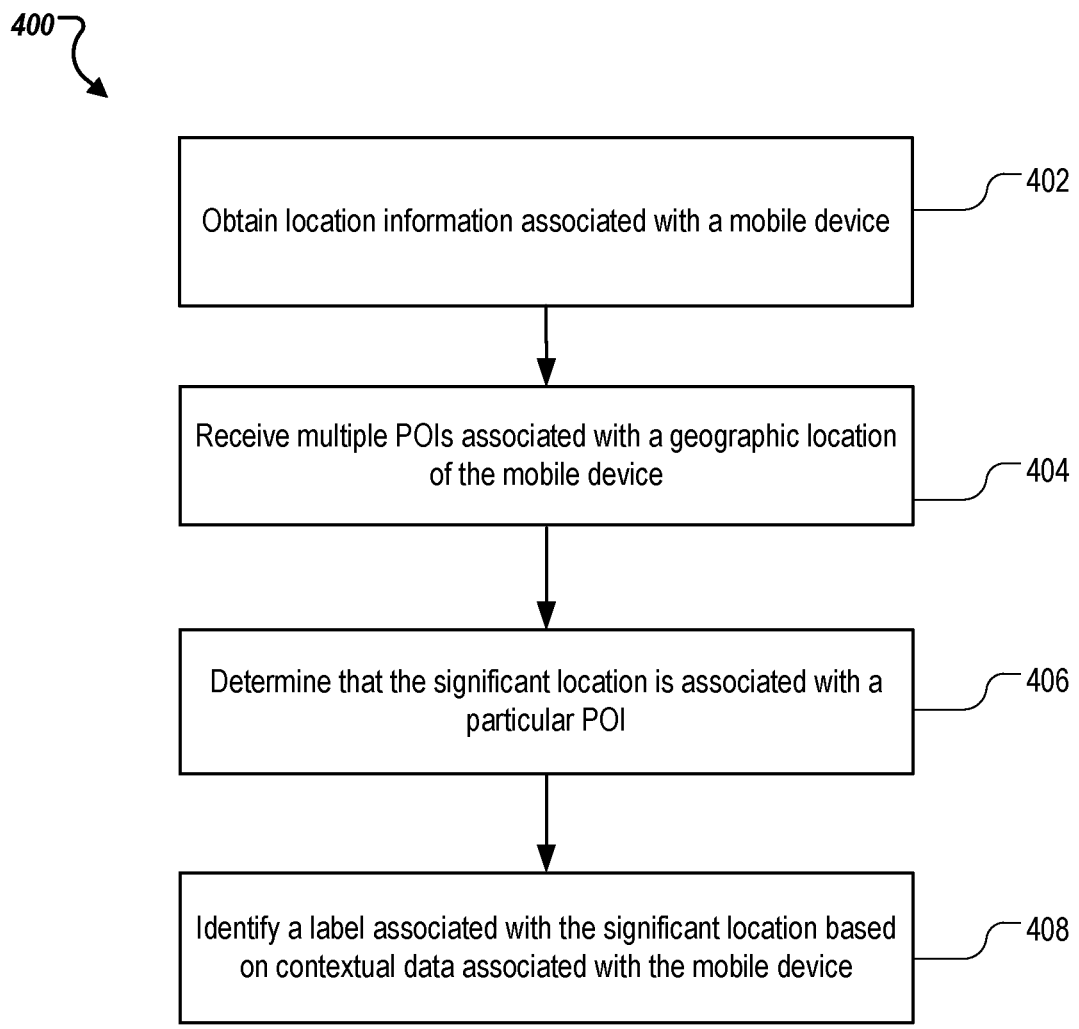
FIG. 4 is a flowchart of an example process for identifying labels for significant locations.

FIG. 4 is a flowchart of an example of a process 400 for identifying labels for significant locations. The process 400 can be implemented as computer instructions stored on a computer-readable storage medium and executed by one or more processors. For example, the process 400 can be implemented by the device architecture 500 described in reference to FIG. 5. In general, process 400 determines a significant location of the computing device. For example, at 402, process 400 obtains one or more significant locations. For example, a significant location estimator can provide a list of significant locations. At 404, for each significant location, process 400 identifies one or more POIs near the significant location. Each POI represents an entity, such as a business, public landmark, school, hospital, etc. Process 400 determines a label for the determined significant location based on contextual data associated with the significant location. At 406, process 400 determines that a POI is the significant location based on contextual data. Examples of contextual data include but are not limited to transaction data, calendar data, map data, communication data, voice commands, and any other data that can provide information that can be used to identify a POI as a significant location.

At 408, a label associated with the determined POI is used to label the significant location.

Exemplary Determination of Significant Locations

Some examples of techniques to determine significant locations are described in this and the following paragraphs. Details about determining significant locations are described in U.S. patent application Ser. No. 14/502,677 entitled "Location-Based Services For Calendar Events", filed on Sep. 30, 2014 and the entire contents of which are incorporated by reference herein in its entirety. Computing device 200 can use machine learning and data mining techniques to learn the past movement of computing device 200. The past movement can be recorded as significant locations visited by computing device 200 and movement of computing device 200 between the significant locations. Computing device 200 can determine that a place or region is a significant location upon determining that, with sufficient certainty, computing device 200 has stayed at the place or region for a sufficient amount of time. The amount of time can be sufficient if it satisfies various criteria, for example, when the amount of time satisfies a time length threshold (for example, X hours) or a frequency threshold (for example, X minutes per day, Y number of days per week). Records of movement of computing device 200 can include a measured or calculated time of entry into each significant location and a measured or calculated time of exit from each significant location. A significant location can be associated with multiple entries and exits.

In addition to significant locations, the records of movement can include transitions between the significant locations. Each transition from a first significant location to a second significant location can be associated with a transition begin timestamp indicating a time computing device 200 leaves the first significant location and a transition end timestamp indicating a time computing device 200 enters the second significant location.

Computing device 200 can represent the records of movement as a state model. State model can include states, each representing a significant location, and transitions, each representing a movement of computing device 200 between significant locations. Additional details of determining the state model are described below.

Based on the state model, computing device 200 can determine (1) a transition probability density that, at a given time, computing device 200 moves from a given significant location to each other significant location, or (2) an entry probability density that computing device 200 enters a significant location from a previously unknown or unrepresented location. A pattern analyzer of computing device 200 can determine a daily, weekly, monthly, or annual movement pattern of computing device 200 using the state model. A predictive engine of computing device 200 can use transition probability density (or entry probability density) and the movement pattern to forecast a significant location that computing device 200 will enter (or stay) at a future time. Computing device 200 can then use the forecast to provide predictive user assistance, for example, to assist the user to plan for a future event.

Exemplary Techniques of Constructing a State Model

The computing device 200 can use the learning techniques to determine the state model. Computing device 200 can sequentially trace location data through time (T).

Sequentially tracing location data can be performed by piggybacking on another application to avoid or reduce cost of location data collection. For example, computing device 200 can collect the location data when another service requests location from a location determination subsystem of computing device 200. Accordingly, collecting the location data can be "free" without having to activate the location determination subsystem solely for determining a movement pattern of computing device 200.

Computing device 200 can collect multiple locations over time T. Collecting new locations can be ongoing operations. Locations can be purged based on a variety of policies, including age, user preference or privacy. The multiple locations can each include latitude, longitude, and altitude coordinates, with a degree of uncertainty in each of these, and be associated with a timestamp indicating a time the corresponding location is collected.

Computing device 200 can determine that some of locations belong to location clusters that may indicate a significant location. Computing device 200 can determine that a location cluster is formed upon determining that (1) at least a pre-specified threshold number (for example, two) of consecutive locations are collected; (2) a time span of the consecutive locations satisfies a pre-specified threshold time window; and (3) these locations are identical, indicating that computing device 200 is stationary, or sufficiently close to one another, indicating that computing device 200 is located in a sufficiently small and defined area during the time the locations are collected.

For example, computing device 200 can determine two location clusters over time T. A first location cluster can include a first subset of locations collected over a time period [T1, T2] that is longer than a threshold time window (for example, a time window of 45 minutes). Computing device 200 can determine that the first location cluster includes the locations in the subset upon determining that a variance of the locations is low enough to satisfy a variance threshold. Likewise, a second location cluster can include a second subset of locations, which are collected within time period [T3, T4]. Computing device 200 can determine that the second location cluster includes the locations in the second subset upon determining that a variance of the locations satisfies the variance threshold.

An outlier detection mechanism can filter out locations that do not belong to clusters. For example, computing device 200 can determine that a location is different from locations in the two subsets (for example, based on a distance threshold being exceeded). In addition, computing device 200 can determine that no other locations are (1) collected within the threshold time window before or after the location and (2) geographically close to that location. In response, computing device 200 can determine that the location is an outlier and discard the location. In addition, if a location in a time period is significantly different from many other locations in the time period, computing device 200 can discard the different location as an outlier and determine the location cluster using other locations in the time window. Computing device 200 can use the first and second location clusters to determine significant locations and states of the state model.

In some implementations, one of the conditions for determining a location cluster is that a time span of the consecutive locations satisfies a variable threshold time window. The threshold can vary based on whether computing device 200 has a hint of significance of a location.

At various times, computing device 200 can be located at different locations. The different locations can be far apart from one another, indicating that computing device 200 is moving. Computing device 200 can be located at the different locations during a continuous period of time. The different locations can be identical or sufficiently close to one another. Computing device 200 can determine whether the period of time is sufficiently long such that the different locations form a location cluster that indicates a significant location, based on whether the period of time satisfies a variable threshold. Computing device 200 can use various hints to determine the variable threshold.

For example, computing device 200 can search locations where computing device 200 visited previously. Computing device 200 can designate as a first hint a record indicating that computing device 200 previously visited the location at or near the different locations as a first hint. Computing device 200 can examine a user search history performed on or through computing device 200. If the user searched for the location before, computing device 200 can designate a search query including an address at or near the different locations, or a business located at or near the different locations, as a second hint. Computing device 200 can designate a calendar item in a user calendar (for example, an appointment or a meeting) located at or near the different locations as a third hint.

Upon detecting one or more hints, computing device 200 can use a shorter time period, for example, five minutes, as a threshold for determining a location cluster or significant location. More hints can correspond to shorter threshold. Accordingly, computing device 200 can determine a significant location upon detecting a location of the computing device, when the short time threshold is satisfied.

If no hint is found, computing device 200 can use a longer time period, for example, 20 minutes, as a threshold for determining a location cluster or significant location. Accordingly, when no hint is found, computing device 200 can determine a location cluster or significant location upon detecting a location of computing device 200, when the long time threshold is satisfied. In either case, with or without a hint, computing device 200 can determine a significant location in real time, for example, 5 minutes or 20 minutes after locations converge into a cluster.

Using the techniques described above, computing device 200 can identify location clusters. Computing device 200 can determine significant locations based on the location clusters.

Computing device 200 can determine each of the significant locations based on the location clusters using the locations in each of the location clusters. Determining the significant locations can be based on recursive filter with a constant gain. Details of determining the significant locations are provided below. Each of the significant locations can include latitude, longitude, and optionally, altitude coordinates. Each of the significant locations can be associated with one or more location clusters. For example, a first significant location can correspond to a first location cluster in time period [T1, T2] and a third location cluster during time period [T7, T8]. The location in the first location cluster and the third location cluster can be identical. The length of time period [T1, T2] and time window [T7, T8] can be the same or different.

Computing device 200 can have an initial state model at time T2. At time T2+k, computing device 200 can receive incremental location data, where k is a difference between time T2 and the time the additional location data are received (in this example, k=T7−T2). Computing device 200 can use the incremental location data to determine the significant location for use in the state model. Computing device 200 can determine that the first location cluster corresponds to latitude and longitude coordinates X1. Computing device 200 can determine that the third location cluster corresponds to latitude and longitude coordinates X2. Computing device 200 can determine that a distance between X1 and X2 satisfies a threshold. In response, computing device 200 can determine that the first location cluster and the third location cluster belong to a same location (i.e., the same significant location). Computing device 200 can then add the third location cluster to the significant location using constant gain filter as shown below in Equation (1).

$$\frac{X2 + \alpha X1}{1 + \alpha}, \text{ where } \alpha \geq 1 \quad (1)$$

Each of the significant locations can be associated with one or more entry timestamps and one or more exit timestamps. Each entry timestamp can correspond to a time associated with a first location in a location cluster. For example, a first entry timestamp associated with the significant location can be a timestamp associated with a location, which is the first location of the first location cluster. A second entry timestamp associated with a significant location can be a timestamp associated with a first location in the third location cluster. Likewise, each exit timestamp can correspond to a time associated with a last location in a location cluster. For example, a first exit timestamp associated with the first significant location can be a timestamp associated with the location, which is the last location of the first location cluster. A second entry timestamp associated with the significant location can be a timestamp associated with a last location in the third location cluster.

Exemplary Device Architecture

Figure 5:
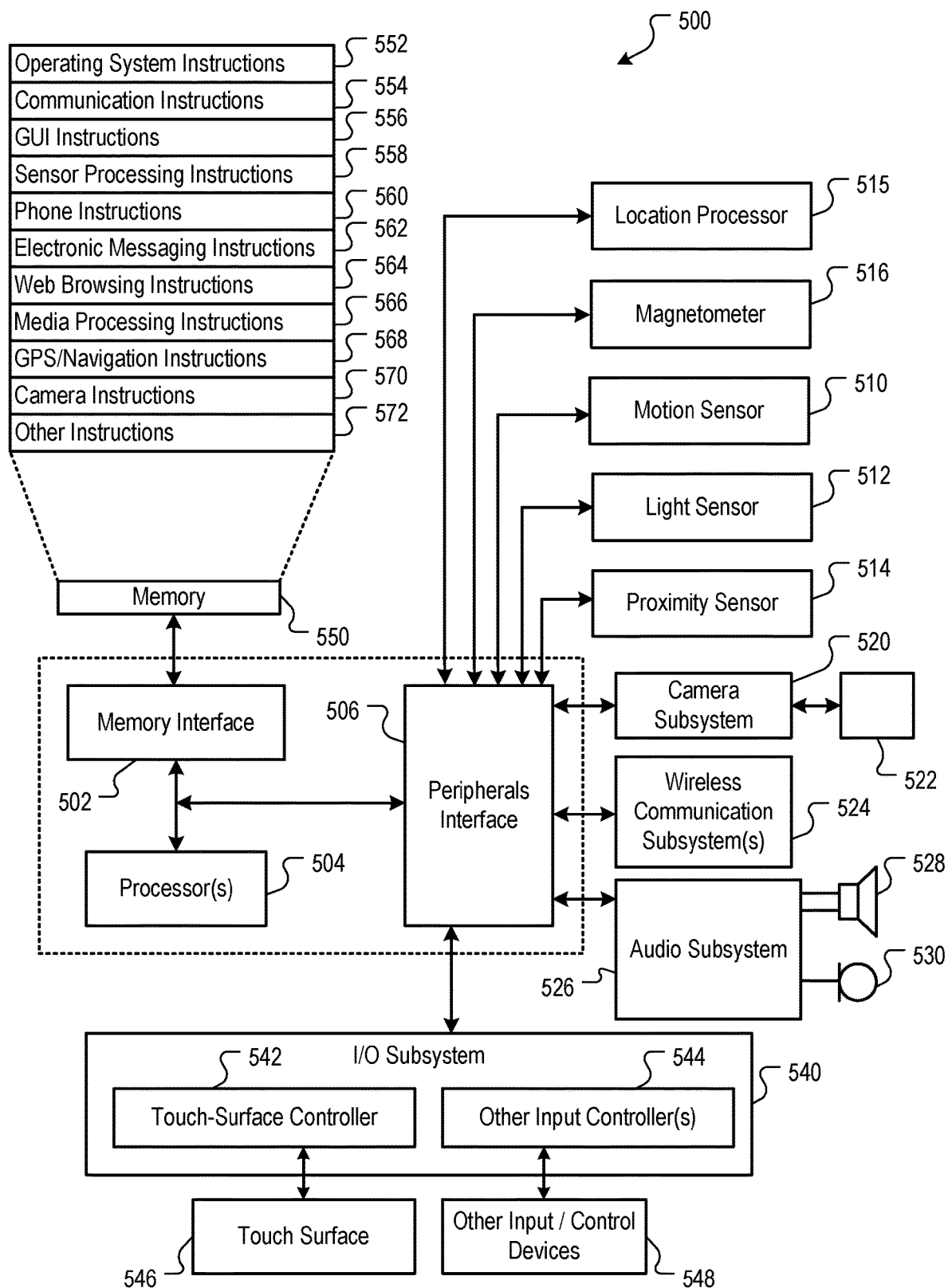
FIG. 5 is a block diagram of an example device architecture for implementing the features and processes described in reference to FIGS. 1-4.

FIG. 5 is a block diagram of example device architecture for implementing the features and processes described in reference to FIGS. 1-4. Architecture 500 may be implemented in any computing device for generating the features and processes described in reference to FIGS. 1-4, including but not limited to smart phones and wearable computers (e.g., smart watches, fitness bands). Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor 510, light sensor 512, and proximity sensor 514 may be coupled to peripherals interface 506 to facilitate orientation, lighting, and proximity functions of the device. For example, in some implementations, light sensor 512 may be utilized to facilitate adjusting the brightness of touch surface 546. In some implementations, motion sensor 510 (e.g., an accelerometer, rate gyroscope) may be utilized to detect movement and orientation of the device. Accordingly, display objects or media may be presented according to a detected orientation (e.g., portrait or landscape).

Other sensors may also be connected to peripherals interface 506, such as a temperature sensor, a barometer, a biometric sensor, or other sensing device, to facilitate related functionalities. For example, a biometric sensor can detect fingerprints and monitor heart rate and other fitness parameters.

Location processor 515 (e.g., GNSS receiver chip) may be connected to peripherals interface 506 to provide georeferencing. Electronic magnetometer 516 (e.g., an integrated circuit chip) may also be connected to peripherals interface 506 to provide data that may be used to determine the direction of magnetic North. Thus, electronic magnetometer 516 may be used as an electronic compass.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication subsystem(s) 524 may include one or more wireless communication subsystems. Wireless communication subsystems 524 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi™, Wi-Max™, ZigBee™), 3G, 4G, 4G LTE, code division multiple access (CDMA) networks, near field communication (NFC), Wi-Fi Direct™ and a Bluetooth™ network. Wireless communication subsystems 524 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 526 may be coupled to a speaker 528 and one or more microphones 530 to facilitate voice-enabled functions, such as voice recognition, voice replication, digital recording, and telephony functions.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 546. In one implementation, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some implementations, device 500 may present recorded audio and/or video files, such as MP3, AAC, and MPEG video files. In some implementations, device 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC™, LINUX™, UNIX®, OS X®, iOS®, WINDOWS®, or an embedded operating system such as VxWorks®. Operating system 552 may include instructions for handling basic system services and for performing hardware dependent tasks. In some implementations, operating system 552 may include a kernel (e.g., UNIX kernel).

Memory 550 may also store communication instructions 554 to facilitate communicating with one or more additional devices, one or more computers or servers, including peer-to-peer communications. Communication instructions 554 may also be used to select an operational mode or communication medium for use by the device, based on a geographic location (obtained by the GPS/Navigation instructions 568) of the device.

Memory 550 may include graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes and functions; camera instructions 570 to facilitate camera-related processes and functions; and other instructions 572 for implementing the features and processes, as described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java®), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a computing device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A method implemented by a computing device, the method comprising:
   receiving, from a location subsystem on the computing device, position coordinates for the computing device;
   determining, by the computing device, that a geographic location of the computing device is associated with a significant location in a set of significant locations stored on the computing device, wherein a significant location is a location having position coordinates inferred from clusters of position coordinates previously gathered by the computing device in response to a determination that the computing device dwelled at the location for a threshold amount of time;
   determining, by the computing device, a label for the significant location based on analysis of contextual data for the significant location, the contextual data collected based on usage of the computing device, wherein the contextual data includes input provided to the computing device to execute an application on the computing device and information associated with a geographic area, the geographic area representing a degree of uncertainty associated with the position coordinates for the computing device;
   assigning, by the computing device, the label to the significant location in the set of significant locations, wherein coordinates for the significant location differ from coordinates of points of interest within the geographic area;
   storing, by the location subsystem on the computing device, an updated set of significant locations to the computing device; and
   displaying on a graphical interface displayed by the computing device, the label for the significant location.

2. The method as in claim 1, further comprising:
   receiving, by the location subsystem on the computing device, from a second application executed by the computing device, a request for data associated with the significant location; and
   in response to the request, providing the data associated with the significant location, wherein the data associated with the significant location includes the label for the significant location; and
   displaying, by a map engine associated with the location subsystem, on behalf of the second application and on a graphical interface displayed on the computing device, the label for the location at a location on the graphical interface.

3. The method as in claim 2, additionally comprising:
   receiving, from the map engine, contextual data associated with a plurality of points of interest, wherein each point of interest represents an entity within the geographic area surrounding the geographic location of the computing device;
   determining, based on the contextual data associated with a plurality of points of interest and the contextual data for the significant location, a correspondence between the significant location and a point of interest; and
   determining, by the computing device, the label for the significant location based on the label associated with the point of interest.

4. The method of claim 3, wherein assigning the label to the significant location in the set of significant locations includes associating the significant location with a map unique identifier (MUID), wherein the MUID includes the label for the significant location, the label is unique to the significant location, and the MUID to uniquely identify the significant location to a map engine associated with the maps.

5. The method of claim 4, wherein the point of interest has an associated MUID and the MUID associated with the significant location is the MUID for the point of interest.

6. The method of claim 1, wherein the geographic area is a first geographic area and the plurality of points of interest are located within a second geographic area that is larger than the first geographic area.

7. The method of claim 6, wherein the second geographic area is twice as large as the first geographic area.

8. The method of claim 1, wherein determining the label for the significant location based on analysis of contextual data for the significant location includes determining that the computing device was at the significant location at a time associated with contextual data.

9. The method of claim 8, wherein the position coordinates for locations within the set of significant locations include an error value representing a degree of geographic uncertainty associated with the locations within the set of significant locations and determining that the geographic location of the computing device is associated with the significant location includes consideration of the error value for the significant location.

10. The method of claim 1, wherein the information associated with the geographic area is received from a map engine associated with the location subsystem and includes route information including a destination location and determining the label for the significant location includes determining that the destination location is the significant location.

11. The method of claim 10, wherein determining that the destination location is the significant location comprises:
   determining a first time at which the destination location was reached;
   determining a second time at which the computing device was located at or near the significant location; and
   determining that the destination location is the determined significant location based on determining that the first time substantially matches the second time.

12. The method of claim 10, wherein the information received from the map engine includes destination locations identified as favorite locations by a user of the computing device, and
   wherein determining, by the computing device, the label for the significant location based on contextual data associated with the significant location comprises determining that one of the destination locations identified as a favorite location by a user is the significant location.

13. The method of claim 10, wherein the information received from the map engine includes destination locations previously viewed using a map application associated with the map engine, and wherein determining, by the computing device, the label for the significant location based on contextual data associated with the significant location comprises determining that a destination location previously viewed using the map application is the significant location.

14. The method of claim 10, wherein the information received from the map engine includes destination locations viewed using a third party application implemented by the computing device, the map engine receives a destination location viewed using the third party application, and determining the label for the significant location based on contextual data associated with the significant location comprises determining that the destination location viewed using the third party application is the significant location.

15. The method of claim 1, wherein the contextual data comprises a plurality of contextual data points and determining that the geographic location of the computing device is associated with a significant location comprises:
   determining a potential significant location based on each of the plurality of contextual data points resulting in a plurality of potential significant locations;
   associating a respective weight to each potential significant location, the respective weight based on a source of a contextual data point on which the potential significant location was determined; and
   determining one of the plurality of potential significant locations to be the significant location based on the weights associated with the plurality of potential significant locations.

16. The method of claim 15, wherein determining one of the plurality of potential significant locations to be the significant location comprises determining that more than half of the plurality of potential significant locations are a same potential significant location.

17. A non-transitory computer-readable medium storing instructions executable by one or more processors of a computing device to perform operations comprising:
   receiving, from a location subsystem on the computing device, position coordinates for the computing device;
   determining, by the computing device, that a geographic location of the computing device is associated with a significant location in a set of significant locations stored on the computing device, wherein a significant location is a location having position coordinates inferred from clusters of position coordinates previously gathered by the computing device in response to a determination that the computing device dwelled at the location for a threshold amount of time;
   determining, by the computing device, a label for the significant location based on analysis of contextual data for the significant location, the contextual data collected based on usage of the computing device, wherein the contextual data includes input provided to the computing device to execute an application on the computing device and information associated with a geographic area, the geographic area representing a degree of uncertainty associated with the position coordinates for the computing device;
   assigning, by the computing device, the label to the significant location in the set of significant locations, wherein coordinates for the significant location differ from coordinates of points of interest within the geographic area;
   storing, by the location subsystem on the computing device, an updated set of significant locations to the computing device; and
   displaying on a graphical interface displayed on the computing device, the label for the significant location.

18. The non-transitory computer-readable medium as in claim 17, the operations further comprising:
   receiving, by the location subsystem on the computing device, from a second application executed by the computing device, a request for data associated with the significant location;
   in response to the request, providing the data associated with the significant location, wherein the data associated with the significant location includes the label for the significant location; and displaying, by a map engine associated with the location subsystem, on behalf of the second application and on a graphical interface displayed on the computing device, the label for the location at a location on the graphical interface.

19. The non-transitory computer-readable medium as in claim 18, the operations further comprising:
receiving, from a map engine, contextual data associated with a plurality of points of interest, wherein each point of interest represents an entity within the geographic area surrounding the geographic location of the computing device;
determining, based on the contextual data associated with a plurality of points of interest and the contextual data for the significant location, a correspondence between the significant location and a point of interest; and
determining, by the computing device, the label for the significant location based on the label associated with the point of interest.

20. The non-transitory computer-readable medium as in claim 19, wherein assigning the label to the significant location in the set of significant locations includes associating the significant location with a map unique identifier (MUID), wherein the MUID includes the label for the significant location, the label is unique to the significant location, and the MUID to uniquely identify the significant location to a map engine associated with the maps.

21. The non-transitory computer-readable medium as in claim 20, wherein the point of interest has an associated MUID and the MUID associated with the significant location is the MUID for the point of interest.

22. A system on a computing device, the system comprising:
one or more processors; and
a memory to store instructions for execution by the one or more processors, wherein the instructions cause the one or more processors to:
receive, from a location determination subsystem on the computing device, position coordinates for the computing device;
determine, by the computing device, that a geographic location of the computing device is associated with a significant location in a set of significant locations stored on the computing device, wherein a significant location is a location having position coordinates inferred from clusters of position coordinates previously gathered by the computing device in response to a determination that the computing device dwelled at the location for a threshold amount of time;
determine, by the computing device, a label for the significant location based on analysis of contextual data for the significant location, the contextual data collected based on usage of the computing device, wherein the contextual data includes input provided to the computing device to execute an application on the computing device and information associated with a geographic area that represents a degree of uncertainty associated with the position coordinates for the computing device;
assign, by the computing device, the label to the significant location in the set of significant locations, wherein coordinates for the significant location differ from coordinates of points of interest within the geographic area;

store, the location subsystem on the computing device, an updated set of significant locations to the computing device;
receive, by the location subsystem on the computing device, from a second application executed by the computing device, a request for data associated with the significant location;
in response to the request, provide the data associated with the significant location, wherein the data associated with the significant location includes the label for the significant location; and
display, by a map engine associated with the location subsystem, on behalf of the second application and on a graphical interface displayed on the computing device, the label for the location at a location on the graphical interface.

23. The system of claim 22, wherein the one or more processors, in response to a determination that the position coordinates for the significant location match the position coordinates for a location within the geographic area, are to determine the label for the significant location based on the location having matching position coordinates.

24. The system of claim 22, wherein the position coordinates for locations within the set of significant locations include an error value that represents a degree of geographic uncertainty associated with the locations within the set of significant locations and to determine that the geographic location of the computing device is associated with the significant location includes consideration of the error value for the significant location.

25. The system of claim 22, wherein the contextual data comprises a plurality of contextual data points and to determine that the geographic location of the computing device is associated with a significant location additionally includes to:
determine a potential significant location within the set of significant locations based on each of the plurality of contextual data points to generate a plurality of potential significant locations;
associating a respective weight to each potential significant location, the respective weight based on a source of a contextual data point on which the potential significant location was determined; and
determining one of the plurality of potential significant locations to be the significant location based on the weights associated with the plurality of potential significant locations.

26. The system of claim 25, wherein the one or more processors are additionally to:
receive, from the map engine, contextual data associated with a plurality of points of interest, wherein each point of interest represents an entity within the geographic area surrounding the geographic location of the computing device;
determine, based on the contextual data associated with the plurality of points of interest and the contextual data for the significant location, a correspondence between the significant location and a point of interest; and
determine, by the computing device, the label for the significant location based on the label associated with the point of interest.

* * * * *